United States Patent Office 3,216,771
Patented Nov. 9, 1965

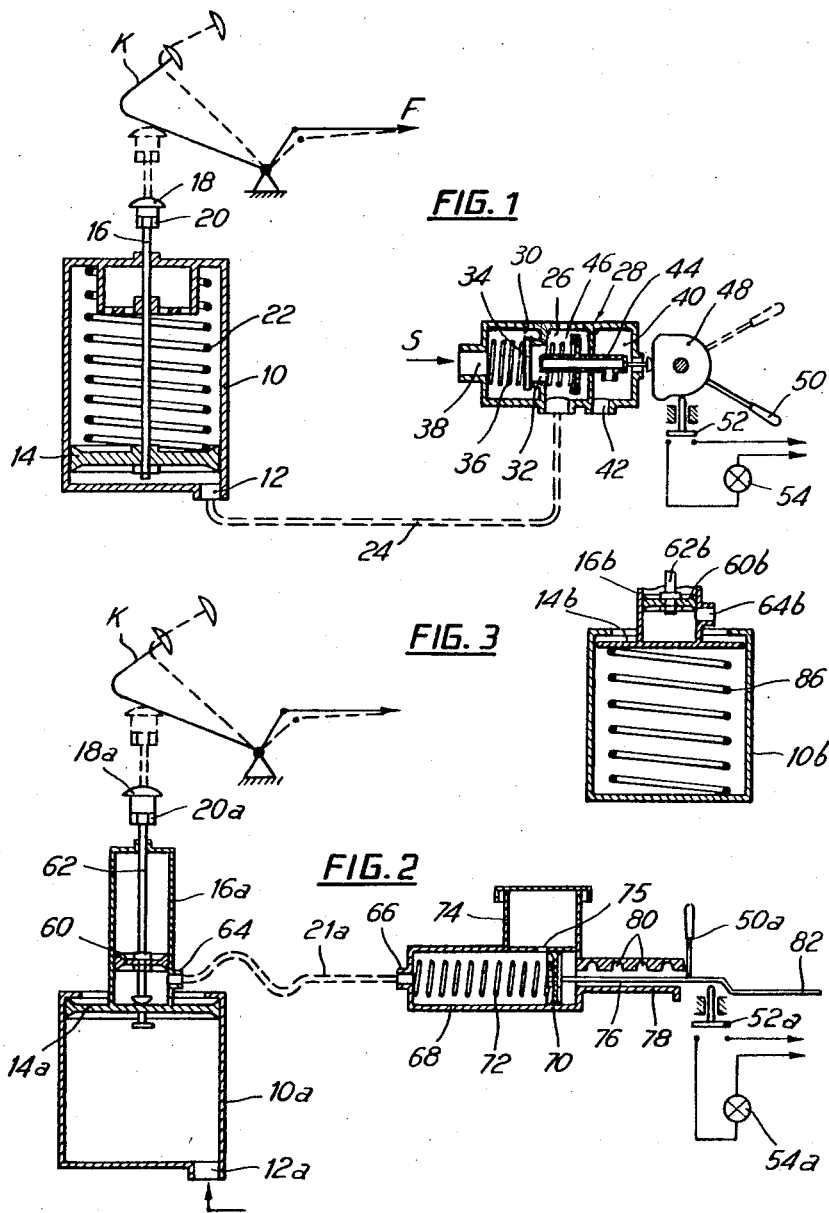

3,216,771
BRAKE PEDAL WITH PRESSURE OPPOSING
REGULATOR
Giuseppe Alfieri, Milan, Italy, assignor to Fabbrica Italiana Magneti Marelli S.p.A., Milan, Italy
Filed May 7, 1962, Ser. No. 192,736
Claims priority, application Italy, May 9, 1961,
8,581/61
7 Claims. (Cl. 303—56)

The present invention relates to apparatus for varying the braking action developed by the brakes of vehicles in relation to the condition of the road.

It is well known that when there are irregularities in the road bed such as patches of ice and snow, the braking of the vehicle will cause the wheels to block due to the decreased friction as the wheel passes over the ice or snow. Apparatus has previously been devised for adjusting the braking action in response to the sudden deceleration of the wheel, but such devices are cumbersome and expensive.

Also, pneumatic or hydraulic devices are known which, under the driver's control, limit the maximum pressure of the fluid actuating the brake members so as to pre-establish the maximum braking effect without giving any effect to any additional push by the driver on the brake lever. These devices are simple and inexpensive but they are not practical because they do not permit good braking efficiency when the road bed is normal.

An object of the present invention is to provide a device which will avoid the above mentioned difficulties and vary the braking action in accordance with the road bed. Another object is to provide such a device which will vary the braking action as needed when irregularities such as ice, snow, or the like are encountered but which may return the braking action back to normal when the road bed again is normal.

Another object is to provide such a device which will allow the driver to operate the brake lever normally until it reaches a predetermined position when counter pressure is effected, thus signalling to the driver when the counter force has come into effect.

It is yet another object of the invention to provide such a braking device which will permit the driver to exert yet greater effort and obtain the maximum braking action even though the counter force is in effect.

Yet another object is to provide such a braking device which includes means for applying counter pressure against the braking member when it is moved beyond a predetermined position and which also includes means available to the driver for connecting and disconnecting the pressure applying means as the driver may desire.

Preferred embodiments of the invention are illustrated by the appended drawing in which:

FIG. 1 is a diagrammatic sectional view of one embodiment of the invention;

FIG. 2 is a diagrammatic sectional view of another embodiment of the invention in which there are several stations at which the brake lever meets additional counter pressure; and FIG. 3 is a diagrammatic sectional view showing yet another embodiment of the invention and wherein the counter pressure is generated by a spring.

Referring to FIG. 1, the illustrated apparatus comprises a cylinder 10 provided with a fitting 12 for the introduction and discharge of compressed air, and in which moves the piston 14, which rod 16 has its free end threaded for holding a push rod 18 locked by a counter nut 20. The push rod 18 co-operates, directly or by means of suitable transmissions with the braking lever K, actuating in a known way the vehicle brake.

A spring 22 acts on the piston 14 for returning the latter to the lowered or rest position, when the compressed air is discharged from the cylinder 10. The fitting 12 is connected by means of a tube 24 to the intermediate chamber 26 of an actuating member 28 and the said chamber communicates with one of the end chambers 30 of the said actuating member by means of an aperture 32 controlled by a valve 34, upon which operates a spring 36. The chamber 30 is fed by means of a fitting 38 with compressed air coming from a suitable generator or reservoir, not illustrated. The other end chamber 40 of the actuating member 28 connects either with the outside through an aperture 42, or with the intermediate chamber 26 by means of a tubular piece 44 upon which acts a spring 46. The tubular element 44 can be caused to slide along its own axis by means of a cam 48 operated by a lever 50; the said cam has such a profile that when the part 44 engages the valve 34, it closes also an electric switch 52, controlling the feed of a lamp 54 which signals to the user the insertion into the braking installation of the apparatus in question. When the hollow piece 44 is in the rest position, the same is disengaged from the valve 34 and therefore the intermediate chamber 26 communicates with the atmosphere through the hole of the said bar and the aperture 42. In these conditions the apparatus is separated from the braking installation and the push rod 18 is maintained stably disengaged from the brake lever, the braking taking place in the normal conditions, i.e., without any additional reaction.

For inserting the apparatus into the braking installation, the user acts upon the lever 50 in order to displace the cam 48 in such a manner that the latter will push upon the perforated bar 44 toward the valve 34, thus closing the communication between the chamber 26 and the discharge aperture 42. Successively, handling of cam 48 lifts the valve 34 from the seat thereof, so that the compressed air contained in the chamber 30 passes into the cylinder. At the same time, the switch 52 is shut and the lamp 54 lighted, signalling to the driver the insertion of the braking limiting device.

The compressed air entering the cylinder 10 displaces the piston 14 against the action of the spring 22, engaging the push rod 18 with the braking lever K, in order to resist thereby, after a certain displacement of the said lever, the further displacement of the latter, limiting thereby the braking action. The diameter of the piston 14 is determined in such a way as to obtain the desired reaction, that is, in relation to the pressure of the air acting upon the said piston.

The apparatus illustrated by the embodiment according to FIG. 2 is like the preceding one and the parts analogous with those of the latter are counterdistinguished by reference numerals. Such device comprises a cylinder 10a, the fitting whereof 12a is connected to the compressed air reservoir of the compressed air of the braking installation. A piston 14a slides in the said cylinder and the rod 16a thereof is hollow and therethrough slides a piston 60.

The stem 62 of the latter is provided with a threaded portion in order to hold the push rod 18a with its associated locknut 20a. The hollow rod 16a is provided with a fitting 64 which is connected through a flexible pipe 21a, to the fitting 66 of a cylinder 68 in which slides a piston 70 under the thrust of a spring 72. The cylinder 68 is hydraulically connected to a reservoir 74 by means of an opening 75, at a suitable location. To the piston rod 76 of the piston 70 is fixed a lever 50a and the said piston rod slides within a guide 78 provided with a slot in the border whereof there are cut notches 80, in which from time to time the lever 50a can be introduced and engaged. In this way lever 50a can assume different positions, to each of which it corresponds a determined initial position of the reaction to the braking action effected by means of the lever K. In this embodiment too, the apparatus provides a switch 52a, which controls the feed circuit of the lamp 54a. To this end the piston rod 76 has at the free end thereof a cam 82 shutting off the switch 52a when the lever 50a is engaged with any one of the notches 80. The chamber of the cylinder 68 and that one of the hollow piston rod 16a, which are at all times respectively comprised between the pistons 60 and 70, and the relative bottoms as well as the pipe line 24a are full with oil. When the piston 70 is in the rest position, the piston 60 is also in the rest position and the push rod 18a is definitely disengaged from the braking lever K. By engaging the lever 50a in one of the notches 80 the piston 70 and then piston 60 and push rod 18a are displaced, which will assume positions corresponding to those assumed by the piston 70, so that the said push rod is more or less approached to the braking lever K. Therefore, the air contained in the cylinder 16a, at the time the said lever K engages the push rod 18a, is more or less compressed and responds to the braking action exerted by the driver upon the lever K.

In the embodiment according to the FIG. 3 the reaction to the braking force, instead of being generated by the compressed air is generated by the action of spring means 86 placed within an envelope 10b wherein slides an end plate 14b solid with a piston rod 16b, which also is hollow for holding the piston 60b.

Referring to FIGS. 1 and 2, the braking lever K may be operated as usual until this lever strikes the push rod 18. When the lever K engages the push rod 18, which in this embodiment serves at its end portion as a contact member, an added counter pressure is applied through the action of the piston 14 which is under fluid pressure. In the case of the embodiment of FIG. 3, the action is the same except that the counter pressure is generated by the action of spring 86.

As a result of the counter pressure which is applied when a predetermined braking action is attained, the driver is made aware that he has accomplished the braking action which corresponds with bad road conditions. Nevertheless, and with the counter pressure still in effect, he may, should an emergency arise, exert a still greater force against the brake lever to overcome the counter pressure and achieve maximum braking action. Thus without disconnecting the mechanism which produces the back pressure the driver may still accomplish maximum braking action. Further, the lamp 54 provides an element of safety by indicating to the driver when the means for generating back pressure is in effect.

It is also possible to use the apparatus shown in FIG. 3 in conjunction with that shown in FIG. 2, and in this case the cylinder 10a must be closed so as to provide an air cushion contributing to the counter pressure applicable to the braking lever. The controlled displacement of the push rod or contacting member 18a (FIG. 2) by the lever K may be accomplished by the use of mechanical members as well as by fluid pressure. Also, adjustable means may be provided for varying the pressure on the piston 14.

In practice, the details of construction and the adjustment of the device may be varied in many respects, all within the spirit of the invention.

I claim:
1. A device for regulating the action of vehicle brakes comprising a brake actuating member responsive to action by the driver and connected so as to be operative for exerting braking effort at the wheels of a vehicle, piston means for pressing said brake lever in a counter direction when said lever is moved past a predetermined position, piston means for pressing said brake lever with a greater pressure when said lever is moved past a second predetermined position, and means operable by the driver of the vehicle for disconnecting and reconnecting both of said means for pressing said brake lever.

2. A device for regulating the action of vehicle brakes comprising a brake actuating member responsive to action by the driver of the vehicle and connected so as to be operative for exerting braking effort at the wheels of a vehicle, piston means for pressing said brake lever in a counter direction when said lever is moved past a predetermined position and for maintaining said pressure until said lever has been withdrawn beyond said position, and means operable by the driver for changing said position whereby said piston means is made effective at a different position of said brake actuating member.

3. A device as set forth in claim 1 which includes a cylinder containing said first mentioned piston means, and which includes means for supplying a predetermined amount of fluid to said cylinder, and a cylinder containing said second mentioned piston means, said last mentioned cylinder being adapted for connection to a source of fluid pressure.

4. A device as set forth in claim 1 including a spring which is arranged to press against said second mentioned piston means.

5. A device for regulating the action of vehicle brakes comprising a brake actuating member responsive to action by the driver and connected so as to be operative for exerting braking effort at the wheels of a vehicle, piston means responsive to fluid pressure for pressing said brake lever in a counter direction when said lever is moved past a predetermined position, means for applying substantially constant fluid pressure against said piston means, said piston means being effective for maintaining pressure in said counter direction until said lever is moved back beyond said predetermined position, and means operable by the driver of the vehicle for disconnecting and reconnecting said means for applying fluid pressure.

6. A device as set forth in claim 5 wherein said means operable by the driver includes a valve which controls passage of fluid to said piston means and which is operable when moved to one position to open said passage and when moved to another position to close said passage.

7. A device as set forth in claim 5 wherein said means operable by the driver includes a valve which controls passage of fluid to said piston means, a cam arranged to to be turned by the driver of the vehicle and operable when turned to one position to open said valve and when turned to another position to close said valve.

References Cited by the Examiner
UNITED STATES PATENTS
2,904,960   9/59   Aikman _____ 188—85 X EUGENE G. BOTZ, *Primary Examiner.*